United States Patent
Hertz et al.

(10) Patent No.: US 7,584,156 B2
(45) Date of Patent: Sep. 1, 2009

(54) METHOD AND APPARATUS FOR ESTIMATING THE REFRESH STRATEGY OR OTHER REFRESH-INFLUENCED PARAMETERS OF A SYSTEM OVER ITS LIFE CYCLE

(75) Inventors: Michael T. Hertz, Manassas, VA (US); Thomas E. Herald, Jr., Warrenton, VA (US)

(73) Assignee: Lockheed Martin Corporation, Manassas, VA (US)

( * ) Notice: Subject to any disclaimer, the term of this patent is extended or adjusted under 35 U.S.C. 154(b) by 695 days.

(21) Appl. No.: 10/440,032

(22) Filed: May 15, 2003

(65) Prior Publication Data

US 2004/0015452 A1 Jan. 22, 2004

Related U.S. Application Data

(60) Provisional application No. 60/380,305, filed on May 15, 2002, provisional application No. 60/419,585, filed on Oct. 18, 2002.

(51) Int. Cl.
*G06Q 99/00* (2006.01)
(52) U.S. Cl. .............................. 705/400; 705/1; 705/10; 705/40
(58) Field of Classification Search ...................... 705/1, 705/7–8, 28, 10, 40, 400; 702/184
See application file for complete search history.

(56) References Cited

U.S. PATENT DOCUMENTS

| | | | |
|---|---|---|---|
| 4,843,575 | A | 6/1989 | Crane |
| 5,293,556 | A | 3/1994 | Hill et al. |
| 6,847,854 | B2 | 1/2005 | Discenzo |
| 7,007,192 | B2 | 2/2006 | Yamazaki |
| 7,020,621 | B1 * | 3/2006 | Feria et al. ..................... 705/10 |
| 7,050,893 | B2 | 5/2006 | Watanabe et al. |

(Continued)

FOREIGN PATENT DOCUMENTS

WO      WO 00/72212      *   5/2000

(Continued)

OTHER PUBLICATIONS

Stouffer et al., "Technology Refreshment Cost Estimating and Planning Model: User's guide", Jun. 2000, Logistics Management Institute, 125 pgs.*

(Continued)

*Primary Examiner*—John W Hayes
*Assistant Examiner*—Freda A Nelson
(74) *Attorney, Agent, or Firm*—Graybeal Jackson LLP

(57) ABSTRACT

A method for estimating the cost of a system over its predetermined life cycle includes estimating refresh and non-refresh costs for the system over its life cycle. By estimating the refresh cost, such a method allows one to select the most cost-effective implementation for the system by comparing the costs of different implementations. For example, if the system is to be installed in a submarine, one can select the most cost-effective system configuration for a given refresh rate, where the refresh rate coincides with the intervals at which the submarine is in port for service. Or, for a given system configuration, one can determine the most cost-effective refresh rate, and thus select the most cost-effective interval for servicing the submarine.

7 Claims, 11 Drawing Sheets

U.S. PATENT DOCUMENTS

| | | | | |
|---|---|---|---|---|
| 7,231,374 | B1* | 6/2007 | Balasinski | 705/400 |
| 2001/0032109 | A1* | 10/2001 | Gonyea et al. | 705/8 |
| 2002/0072956 | A1* | 6/2002 | Willems et al. | 705/10 |
| 2003/0033191 | A1* | 2/2003 | Davies et al. | 705/10 |
| 2003/0055749 | A1* | 3/2003 | Carmody et al. | 705/28 |
| 2003/0067873 | A1 | 4/2003 | Fuhrmann et al. | |
| 2003/0144953 | A1* | 7/2003 | Razum et al. | 705/40 |
| 2003/0149548 | A1* | 8/2003 | Mosses et al. | 702/184 |
| 2003/0212643 | A1* | 11/2003 | Steele et al. | 705/400 |
| 2004/0010474 | A1 | 1/2004 | Hertz et al. | |
| 2004/0015452 | A1 | 1/2004 | Hertz et al. | |
| 2004/0165029 | A1 | 8/2004 | Park | |

FOREIGN PATENT DOCUMENTS

WO    WO 0072212 A2 * 11/2000

OTHER PUBLICATIONS

Littlejohn et al., "Reengineering: An Affordable Approach for Embedded Software Upgrade", Dec. 2001, The Journal of Defense Software Engineering, 5 pgs.*

Haines, Linda, "Technology Refreshment Within DoD: Proactive Technology Refreshment Plan Offers DOD programs Significant Performance, Cost, Schedule Benefits", Mar.-Apr. 2001, 6 pgs.*

Ellram, Lisa, "Total Cost of Ownership: Ownership Elements and Implementation", Fall 1993, International Journal of Purchasing and Materials Management, 29, 4, ProQuest Central, p. 3, 9 pgs.*

Stouffer et al., "Technology Refreshment Cost Estimating and Planning Model: User's Guide", Jun. 2000, Logistics Management Institute, 125 pgs.*

Haines, Linda, "Technology Refreshment Within DoD: Proactive Technology Refreshment Plan Offers DOD Programs Significant Performance, Cost, Schedule Benefits", Mar.-Apr. 2001, 6 pgs.*

David J. Vanbuskirk, et al., "Maintenance Free Operating Period (MFOP) ARCI Pilot In-Process Effects", ASNE Day 2005 Conference & Exhibition, Track 1, Apr. 26, 2005.

Thomas E. Herald, Jr., "Technology Refreshment Strategy and Plan for Application in Military Systems—A how- To Systems Development Process and Linkage with CAIV", 2000 Lockheed Martin.

David Vanbuskirk, Thomas E. Herald, Jr., "Maintenace Free Operating Period (MFOP) Initiative—Case Study", Undersea Defence Technology Conference & Exhibition, Oahu, Hawaii, Aug. 16, 2004.

Tom Herald, et al., "MS2—Undersea Systems Lifetime Support Process for Rapidly-Changing, Technology-Intensive Systems", Lockheed Martin, May 20, 2004.

Blanchard, B.S., Verma, D., Peterson, E.L., Maintainability—A Key to Effective Serviceability and Maintenance Management, Wiley-Interscience Publication, John Wiley & Sons, Inc., New York, New York, 1995 (pp. 15-16).

David J. Vanbuskirk, et al., "Maintenance Free Operating Period (MFOP) Initiative—ARCI Pilot In-Process Effects", pp. 1-7, ASNE Day 2005 Conference & Exhibition, Track 1, Apr. 26, 2005.

* cited by examiner

METHOD AND APPARATUS FOR ESTIMATING THE REFRESH STRATEGY OR OTHER REFRESH-INFLUENCED PARAMETERS OF A SYSTEM OVER ITS LIFE CYCLE

CLAIM OF PRIORITY

This application claims priority to U.S. Provisional Application Ser. No. 60/380,305, filed on May 15, 2002, and to U.S. Provisional Application Ser. No. 60/419,585, filed on Oct. 18, 2002, which are both incorporated by reference.

CROSS-REFERENCE TO RELATED APPLICATION

This application is related to U.S. patent application Ser. No. 10/440,438 entitled "METHOD AND APPARATUS FOR ESTIMATING THE REFRESH STRATEGY OR OTHER REFRESH-INFLUENCED PARAMETERS OF A SYSTEM OVER ITS LIFE CYCLE", which was filed on the same day as the present application and which is incorporated by reference.

BACKGROUND

Before acquiring a system for a particular application, one often desires to first determine which implementation of the system is "best" over the system's anticipated life cycle. One often uses cost to determine which system implementation is best. For example, one may compute the costs for a number of system implementations and then select the implementation having the lowest cost. To conduct such a cost comparison, one should first determine the parameters of each system implementation, such as the initial acquisition, operation and support (O/S), and refresh parameters. Then, for each system implementation, one can compute the implementation's total cost as the sum of the costs of these parameters.

For example, assume that the United States Navy (USN) wishes to outfit a submarine with the least expensive implementation of an electronic warfare (EW) system that is anticipated to last for twenty years before needing replacement. The total cost of this system includes the initial-acquisition cost, the operation and support (O/S) cost, and the refresh cost. The initial-acquisition cost is the cost of acquiring the initial system. For example, the USN may acquire an EW system by designing the system, purchasing the parts, assembling the system, and installing the assembled system on a submarine. Or, the USN may acquire the EW system by purchasing it, and perhaps the installation, from a supplier. The O/S cost is the cost of repairing and otherwise maintaining the system in working order. And the refresh cost is the cost of periodically upgrading, i.e., refreshing, the system. An example of refreshing the system is replacing a processor with a next-generation processor that has increased functional capacity (e.g., faster clock speed, larger bus size) relative to the replaced processor. Consequently, the USN may wish to estimate and compare these costs for a number of competing implementations of the EW system and use this comparison as a criterion for choosing an implementation of the system.

Two parameters that distinguish one system implementation from another are the system configuration and the system refresh strategy. Typically, the system configuration is defined by the parts that the configuration includes (i.e., at least some parts of one configuration are typically different from the parts of another configuration), and the refresh strategy is defined by the refresh rate and the parts to be refreshed. For example, the USN can typically refresh a submarine system only when the submarine is in port, and a submarine is typically in port at predetermined intervals. Consequently, the USN may wish to compare the costs for different configurations of an EW system at a given refresh rate to determine the most cost-effective configuration for a given port interval. Or, the USN may wish to compare the costs for a configuration of the EW system at different refresh rates to determine the most cost-effective port interval for a given configuration. In addition, the USN may wish to compare costs for refreshing a part versus replacing the part. For example, the USN may wish to compare the cost of a particular EW system configuration where a sonar subsystem is periodically refreshed to the cost of the same configuration where the sonar subsystem is periodically replaced.

Unfortunately, as discussed below, although cost-estimation tools are available for allowing one to compare the cost of one system implementation to another, these cost-estimation tools often cannot determine or otherwise provide the refresh-dependent parameters of the system. That is, these tools cannot provide a refresh strategy that will yield the estimated cost.

FIG. 1 is a block diagram of a conventional system 10, which is formed from a number of subsystems 12 and components 14. Specifically, the components 14a compose the subsystems 12, the components 14b compose the system 10 directly, and the subsystems 12 and the components 14a and 14b are collectively referred to as the system parts 16. For example, if the system 10 is an EW system for a submarine (not shown), then the subsystems 12 may include, e.g., an infrared torpedo guidance system, a sonar system, and one or more displays and the components 14a and 14b may include, e.g., microprocessors, memories, transistors, resistors, and capacitors. Typically, the system designer purchases the subsystems 12 as complete units and installs them in the system 10, although the designer may design and assemble some or all of the subsystems.

FIG. 2 is a price curve 20 that plots the purchase price of a part 16 (FIG. 1) vs. time over the part's life cycle. The life cycle of a part 16 is typically divided into the following five periods: introduction, growth, maturity, decline, and obsolete. It is during the introduction period that the part 16 first becomes commercially available and is typically at its highest price. During the growth period, which is effectively a continuation of the introduction period, the manufacturing volume continues to increase and the price continues to decrease. During the maturity period, the manufacturing volume levels off at a maximum level and the price levels off at a minimum level. During the decline period, the manufacturing volume begins to decline and the price begins to increase due to lower demand, which is typically due to the anticipated release of a next generation of the part 16. And during the obsolete period, which is at the end of the part's life cycle, the manufacturing volume falls toward zero and the price increases sharply for the last available parts. Typically, the obsolete period coincides with the introduction, growth, or maturity period of the next generation of the part 16. For example, such a price curve applies to microprocessors such as the Pentium® series from Intel®. When the Pentium® III was first introduced, it had a relatively high price, but this price decreased over time. Now, with the introduction of the Pentium® IV and subsequent-generation processors, Intel® is manufacturing fewer Pentium III® processors, and this will eventually cause a corresponding increase in price.

Referring to FIGS. 1 and 2, some conventional cost-estimation tools estimate only an initial-acquisition cost of a system 10. Typically, a cost-estimation tool is implemented in software, and one provides the tool with the identity, quantity, and price of a currently available generation of each part 16 that composes the system 10. This data is typically called the bill of materials (BOM). If one intends to purchase a subsystem 12 instead of designing and assembling the subsystem, then he typically enters this data for the subsystem as a whole, and does not enter this data for each component 14a that composes the subsystem. That is, the subsystem 12 is represented by a single entry in the BOM. From the quantity and price data, the system generates a total price for purchasing the parts 16. Then, using one of a number of conventional algorithms, the tool calculates the initial-acquisition cost of the system 10 as a function of the total purchase price for the parts 16. This initial-cost algorithm accounts for the costs incurred in acquiring the system 10 other than the purchase price of the parts 16. Such costs include the costs for designing, assembling, and testing the system 10. Furthermore, this algorithm typically has been developed empirically based on the initial acquisition costs of existing systems, and is typically specific to the type or technology of the system 10. For example, an initial-cost algorithm for an EW system is typically different than an algorithm for a financial-accounting computer system.

Unfortunately, such cost-estimation tools cannot provide a refresh strategy of a system 10 because refresh occurs after the initial acquisition of the system.

Still referring to FIGS. 1 and 2, other conventional cost-estimation tools can estimate post-acquisition costs for a system 10 that is implemented with a replacement strategy. According to one technique, a cost-estimation tool assumes that enough spare parts 16 are purchased when the system 10 is acquired to keep the system operational for its anticipated life cycle. Therefore, in addition to entering the BOM as discussed above, one enters for each part 16 in the BOM, from which the tool calculates a respective price curve for the currently available generation of each part, and a minimum time before failure (MTBF). Such historical data typically includes the price over time for the currently available generation of each part 16, as well as the prices over time and the life cycles of prior generations of each part. Then, from this data, the tool determines how many spares of each part 16 are needed to maintain the system 10 in working order for its entire anticipated life cycle, and the best time to buy these spares, which is typically the period of lowest price, i.e., the maturity period. For example, suppose that the anticipated life cycle of the system 10 is twenty years starting from the present, the system includes ten processors that each have an MTBF of five years, and the currently available generation of these processors will be in the maturity period of its price curve for the next two years. Therefore, the tool determines that a minimum of thirty spare processors are needed to last the twenty-year life of the system 10, and calculates the total cost of the system by assuming that one will purchase forty processors (ten initial, thirty spares) during the next two years. Then, using a conventional algorithm, the tool estimates the cost of the system 10 over its life cycle as a function of the prices of the initial parts 16 and the required spares.

Unfortunately, as discussed above, although such a cost-estimation tool may provide an accurate cost estimate for a system 10, it does not provide a refresh strategy for achieving the system.

A system administrator often prefers a refresh strategy over a replacement strategy. That is, an administrator often prefers to refresh a currently installed part 16 with an available next generation of the part instead of merely replacing the parts with the same generation, which may no longer be available at the time of the refresh. For example, assume that the system 10 has an anticipated life cycle of twenty years and includes a processor that has a MTBF of five years, and that a subsequent generation of the processor comes along about every five years. An administrator may prefer to refresh the processor every five years with an available next-generation processor instead of purchasing three spare processors at the beginning of the system's life. Reasons for this preference include a desire to spread the price of purchasing new parts 16 over the life of the system 10 instead of buying spares up front, to avoid the cost for storing the spares, and to take advantage of increases in the functional capacities of and other improvements in subsequent generations of the parts. Consequently, a tool that estimates post-acquisition costs of the system 10 based on buying spare parts 16 up front (replacement strategy) does not determine, and thus does not provide, a refresh strategy for achieving the system. Therefore, if the system administrator chooses to achieve the system 10 using a refresh strategy, he must determine the refresh strategy with no help from the tool.

Therefore, a need has arisen for a tool such as a cost-estimation tool that determines and provides a refresh strategy for achieving a selected system.

SUMMARY

According to one embodiment of the invention, a method is provided for estimating a cost of a system over the system's life cycle. The method includes estimating both refresh and non-refresh costs for the system over its life cycle.

By estimating the refresh cost, such a method allows one to select the most cost-effective implementation for the system by comparing the costs of different implementations that include a refresh strategy. For example, if the system is to be installed in a submarine, one can select the most cost-effective system configuration for a given refresh rate, where the refresh rate coincides with the intervals at which the submarine is in port for service. Or, for a given system configuration, one can determine the most cost-effective refresh rate, and thus select the most cost-effective interval for servicing the submarine.

DETAILED DESCRIPTION

Generally, a method according to an embodiment of the invention allows one to determine the most cost-effective implementation of a system 10 (FIG. 1) by estimating and comparing the total costs of different implementations of the system, where at least some of the implementations are achieved with a refresh strategy. For each system implementation, the method may predict and provide the refresh strategy that will yield the estimated cost. Or, one can provide the refresh strategy so that the method calculates the system costs based on the provided refresh strategy. Alternatively, one can provide portions of the refresh strategy and allow the method to predict the remaining portions of the refresh strategy. Because the refresh cost is portion of the total cost of a system 10 (assuming that the system is implemented with a refresh strategy), a major feature of this embodiment is that it can estimate the respective refresh cost for each implementation by taking into account the respective refresh strategy for that implementation. More specifically, for each refresh event, the method estimates the corresponding increase in the system's functional capacity, and assumes that to the extent possible, this capacity increase will be used to minimize the refresh cost for that event.

Because this embodiment of the method is directed toward comparing the cost of different system implementations, and not to estimating the absolute cost of any particular implementation, the method may provide a rough estimate of the absolute system cost and yet still provide an accurate cost comparison. For example, in one embodiment, the method estimates the total cost of a system 10 within approximately ±20% of the actual cost. Even though this may be a relatively inaccurate estimate for an absolute cost, it is often relatively accurate for comparison purposes. For example, assume that the actual total costs of first and second implementations of a system 10 are $6,000 and $12,000 respectively. Further assume that the method estimates these costs at $7,200 and $14,400, respectively. Even though method's estimates are +20% off, the ratio of the method's estimates is 2/1, which is the same as the ratio of the actual costs.

This embodiment of the cost-comparison method is described below in conjunction with determining the total cost of a system 10 that is implemented with a refresh strategy. It is understood that this method can then be repeated for each additional system implementation, and that one can then compare the resulting estimated costs to determine the most cost effective implementation.

Figure 3:
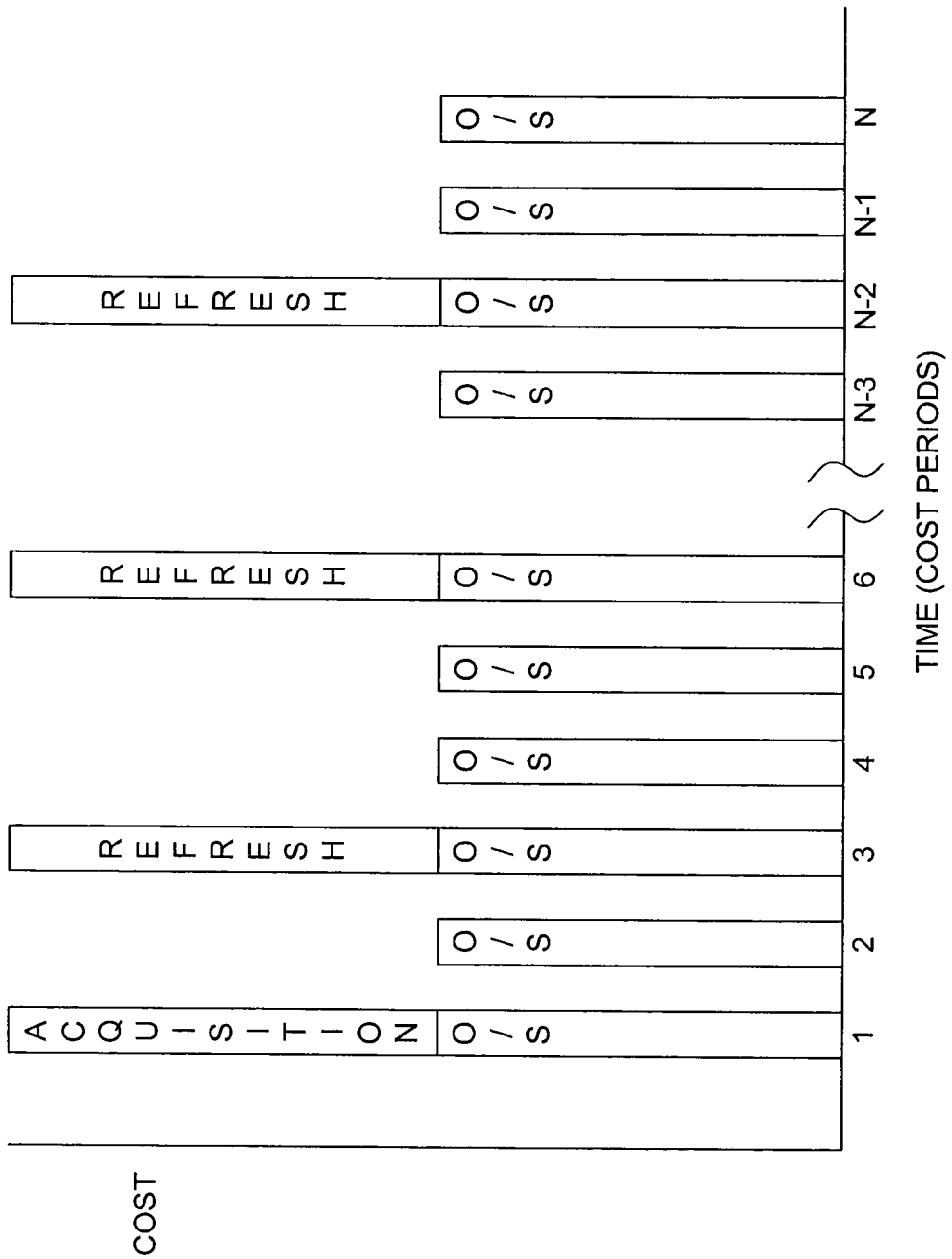
FIG. 3 is a graph that illustrates the periodic costs of the system of FIG. 1 according to an embodiment of the invention.

FIG. 3 is a chart that illustrates a break down of the costs for a system that is implemented with a refresh strategy according to an embodiment of the invention. A system, such as the system 10 of FIG. 1, has a life cycle of n cost periods (e.g., months, years), and for each period the chart shows the periodic system costs, which are broken down into three categories: initial-acquisition cost, O/S cost, and refresh cost. The total cost for the system is the sum of these periodic costs. Although for clarity the periodic O/S and the refresh costs are shown as constant over the life cycle of the system, and the initial-acquisition cost is shown equal to the periodic refresh cost, this is typically not the case because these three costs can vary relative to each other and from period to period. Furthermore, although the refresh rate is shown as being every third period over the system's life cycle, it may have a different value or vary over the system's life cycle. For example, the refresh rate may be every other period over the system's life cycle, or may be every other period for the first six periods and every third period from the seventh period onward.

Figure 4A:
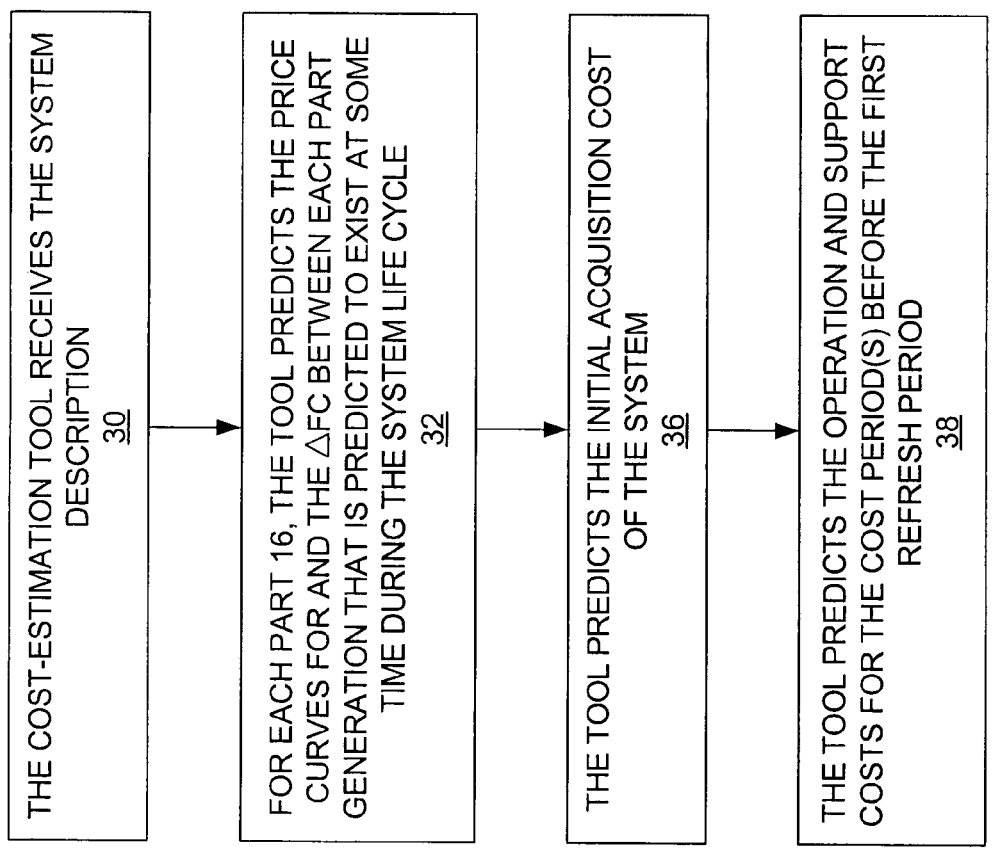
FIGS. 4A-4C are a flow diagram of a method for determining a total cost of a system over the system's life cycle according to an embodiment of the invention.
Figure 4B:
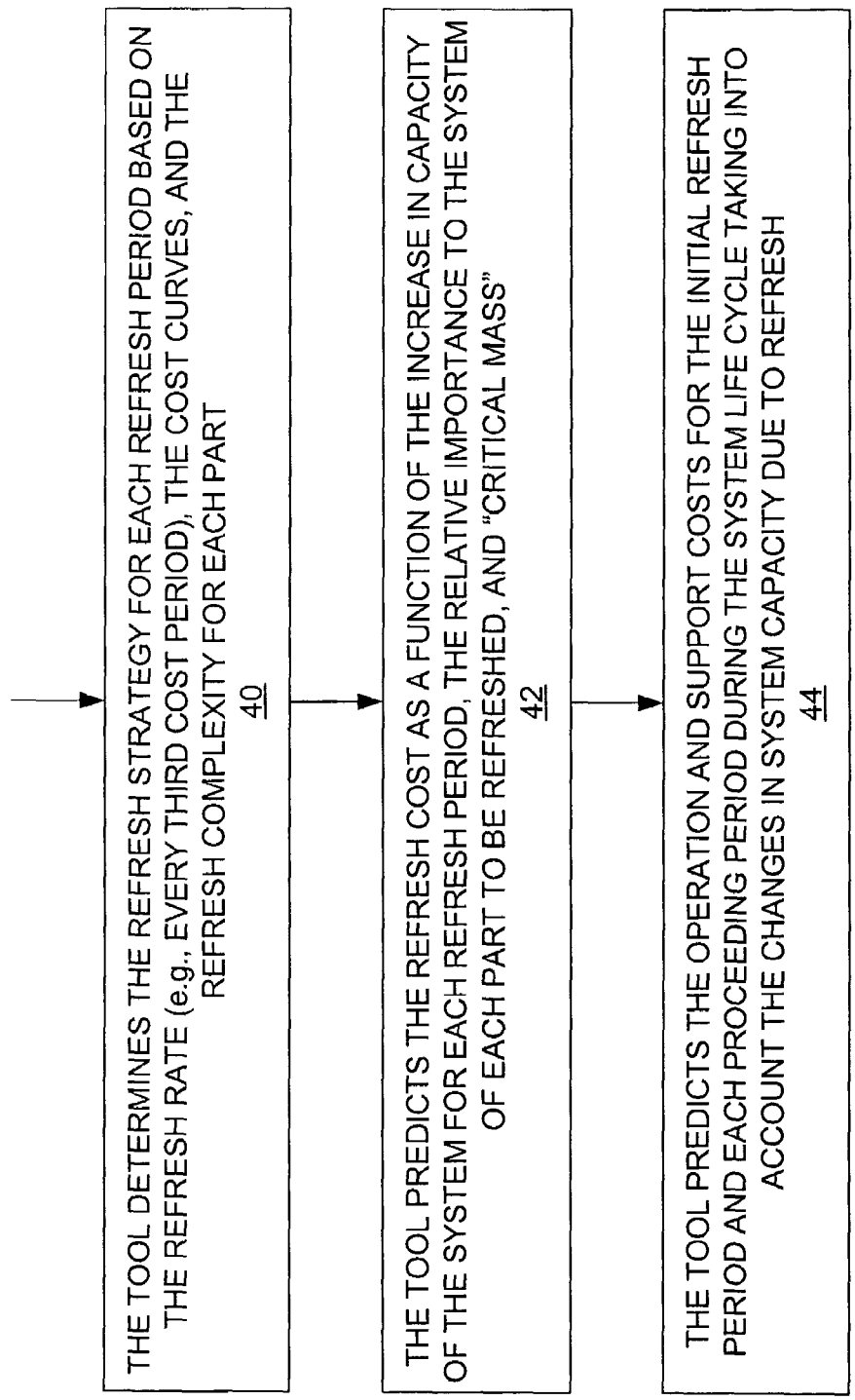
Figure 4C:
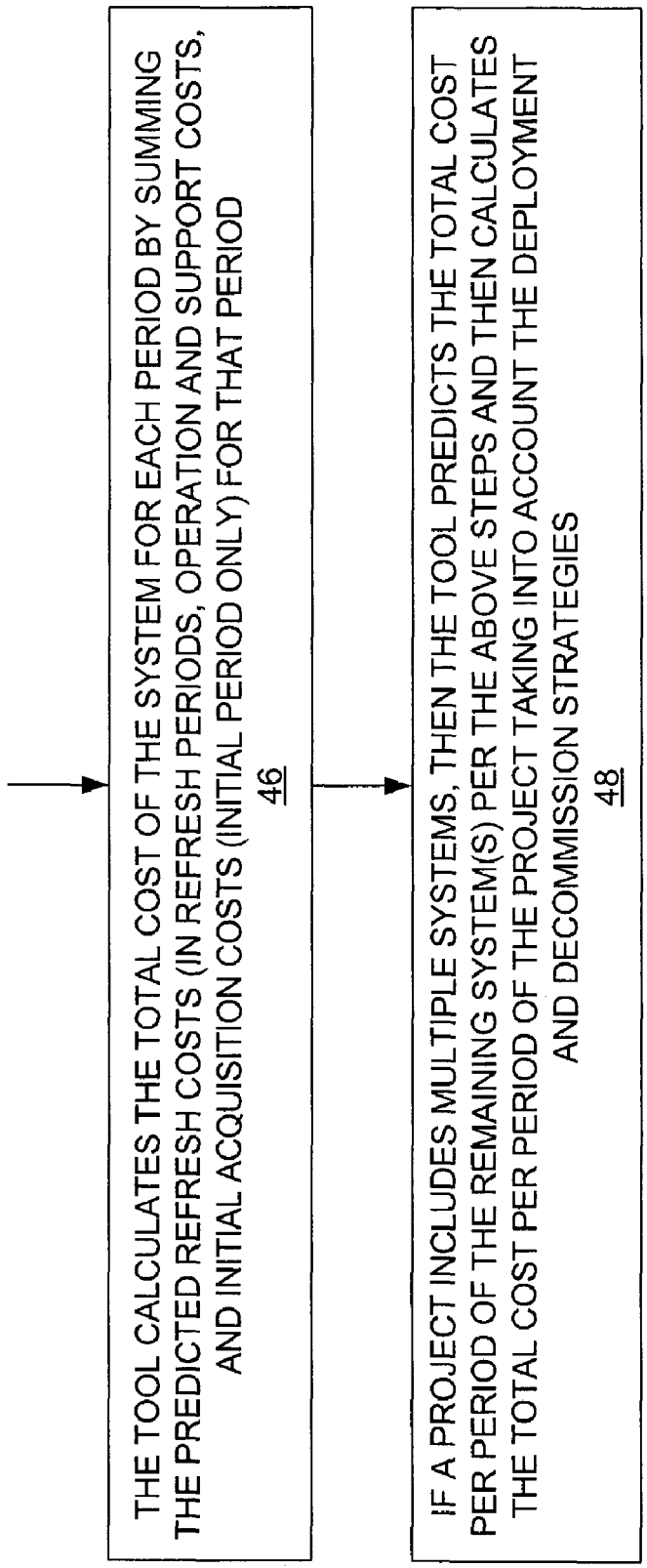

FIGS. 4A-4C are a flow diagram of a method according to an embodiment of the invention for estimating the costs of a system that is implemented with a refresh strategy. For example purposes, the method is described as estimating costs for an implementation of the system 10 of FIG. 1, although the method can be used to estimate costs for another implementation of the system 10, or an implementation of any other system. Furthermore, in the described embodiment, a computer (FIG. 9) executes a software program to implement the method, although the method can be implemented in other ways. Hereinafter, "cost-estimation tool" or "tool" is used to refer to the software or to the combination of the computer and the software. Moreover, although the flow diagram presents the steps of the method in an order chosen for clarity of explanation, one may perform these steps in another order.

Generally, the method uses price-curve and functional-capacity data to determine a potential increase in the functional capacity of the system 10 due to each refresh event, and assumes that to the extent possible, this potential increase is used minimize the cost of the system, not to increase its functional capacity. For example, suppose that the system 10 initially includes ten initial-generation processors and that a subsequent generation of processor that is available for a refresh event has twice the functional capacity of an initial-generation processor. That is, five of the subsequent-generation processors can do the work of the ten initial-generation processors. Therefore, when estimating the cost of the system 10, the method assumes that the ten initial-generation processors are replaced with only the number—here five—of subsequent-generation processors needed to maintain the functional capacity of the system at the pre-refresh level. This minimizes the cost of the refresh. In some cases, refreshing the system 10 in such a manner costs less than merely replacing the ten initial-generation processors with ten spare initial-generation processors.

Figure 1:
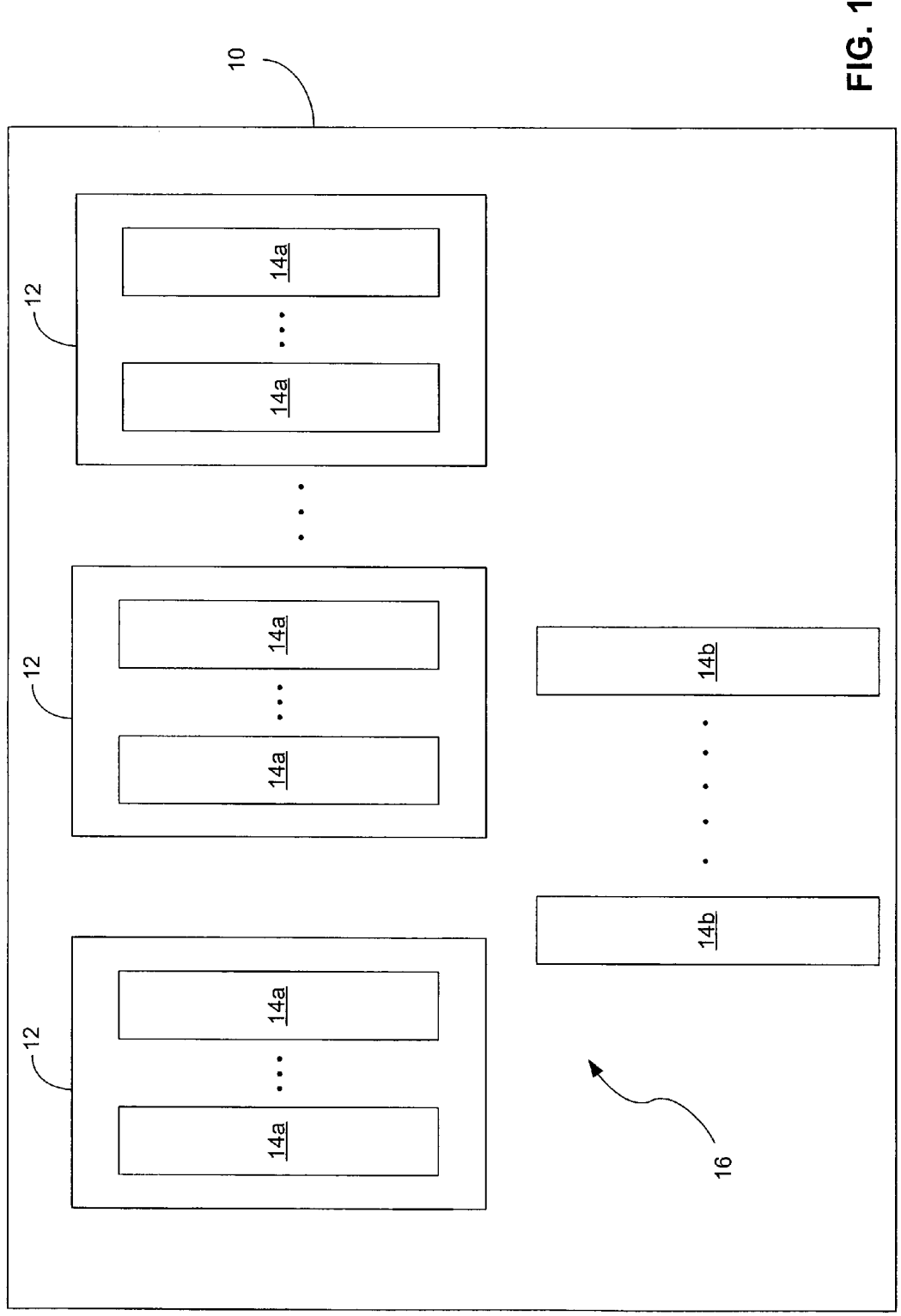
FIG. 1 is a block diagram of a conventional system and the parts that compose the system.

Referring to FIG. 1 and to step 30 in FIG. 4A, one first provides to the cost-estimation tool data that describes the system 10, where such data includes, but is not limited to, the BOM, MTBF, and historical data for each part 16, the system refresh rate, the system deployment and decommission strategies, and the system repair strategy. One may enter the data in any conventional manner, such as via a keyboard, or may instruct the tool to download the data from a local or remote database. Where the database is remote relative to the tool, such downloading may occur via the internet.

The BOM and the MTBF are described above in conjunction with FIGS. 1 and 2.

A first piece of the historical data is the price-vs.-time data for prior and currently available generations of each part 16. As discussed below, the tool can generate from this data price curves for currently available and future generations of each part 16.

A second piece of the historical data is a measure of the functional capacities for prior and currently available generations of each part 16. This data allows the tool to predict an increase in the functional capacity from one generation of a part 16 to the next generation. For example, assume that a generational sequence of prior-generation processors (e.g., Pentium III 500 MHz, Pentium III 866 MHz, and Pentium III 1.0 GHz, Pentium III 1.5 GHz) can respectively perform one billion operations per second (1 Gop/s), 2 Gop/s, 5 Gop/s, and 10 Gop/s. By averaging the increase in functional capacity over this sequence of prior-generation processors, the tool can predict that the functional capacity for each next-generation processor is approximately twice the functional capacity of the immediately preceding generation. In other embodiments of the invention, however, the tool can predict the functional capacities for next-generation parts using a technique other than averaging.

A third piece of the historical data is a measure of the time between the introduction of sequential prior and currently available generations of each part 16. This data allows the tool to predict the respective time between introduction of one future generation of a part 16 to the introduction of the next generation. For example, assume that a sequence of prior-generation processors (e.g., Pentium III 500 MHz, Pentium III 866 MHz, and Pentium III 1.0 GHz, Pentium III 1.5 GHz) are respectively introduced in January 1996, December 1996, January 1998, and March 1999. By averaging the time between introductions over this sequence, the tool can predict that a future-generation processor is introduced approximately one year after the immediately preceding generation. In other embodiments of the invention, however, the tool can predict the time between introduction of successive generations using a technique other than averaging.

A fourth piece of historical data is a measure of the changes between sequential prior and currently available generations of each part 16. This data allows the tool to compute the level of difficulty, i.e., the complexity level, for refreshing each element 16. For example, assume that ten initial-generation processors are to be refreshed with five next-generation processors that each have twice the functional capacity as an initial-generation processor. If a technician can merely "plug" the five next-generation processors into five of the circuit-board receptacles from which five of the initial-generation processors were removed, then the complexity level is relatively low because one can refresh the processors with relatively little effort. But if the technician must install a new circuit-board to accommodate the five next-generation processors, then the complexity level is higher. Historical data for prior and currently available generations of the processor can give an indication of the refresh complexity level. For example, if historical data shows that subsequent generations of the processor are designed to be backwards compatible (e.g., have the same number of pins and the same signal-to-pin assignments) with prior generations, then the tool determines that the refresh complexity level is relatively low. Conversely, if historical data shows that subsequent generations of the processor are not backwards compatible (e.g., have different numbers of pins or different signal-to-pin assignments), then the tool determines that the refresh complexity level is relatively high. Typically, the cost of refreshing a part 16 is proportional to the complexity level. That is, the lower the complexity level the lower the cost, and the higher the complexity level the higher the cost. Therefore, in one embodiment, the tool assigns to each part 16 a level of refresh complexity, and, as discussed further below, takes the assigned complexity level into account when estimating the cost of refreshing the part.

Still referring to FIG. 1 and to step 30 of FIG. 4A, the refresh rate determines when the system 10 is refreshed, e.g., every third period.

If one wishes to implement a project that includes multiple systems 10, then the deployment and decommission strategies indicate when each system respectively goes on and comes off line. For example, assume that there are three identical systems 10 each having an anticipated lifetime of twenty years. One may wish to deploy the first system in year one, the second system in year two, and the third system in year three, and, consequently, may wish to decommission the first system after year twenty, the second system after year twenty one, and the third system after year twenty two.

And if multiple systems 10 are deployed in a staggered manner per the preceding paragraph, then the sparing strategy indicates whether a decommissioned system will be used to provide spare parts 16 for the system(s) still in service.

Figure 5:
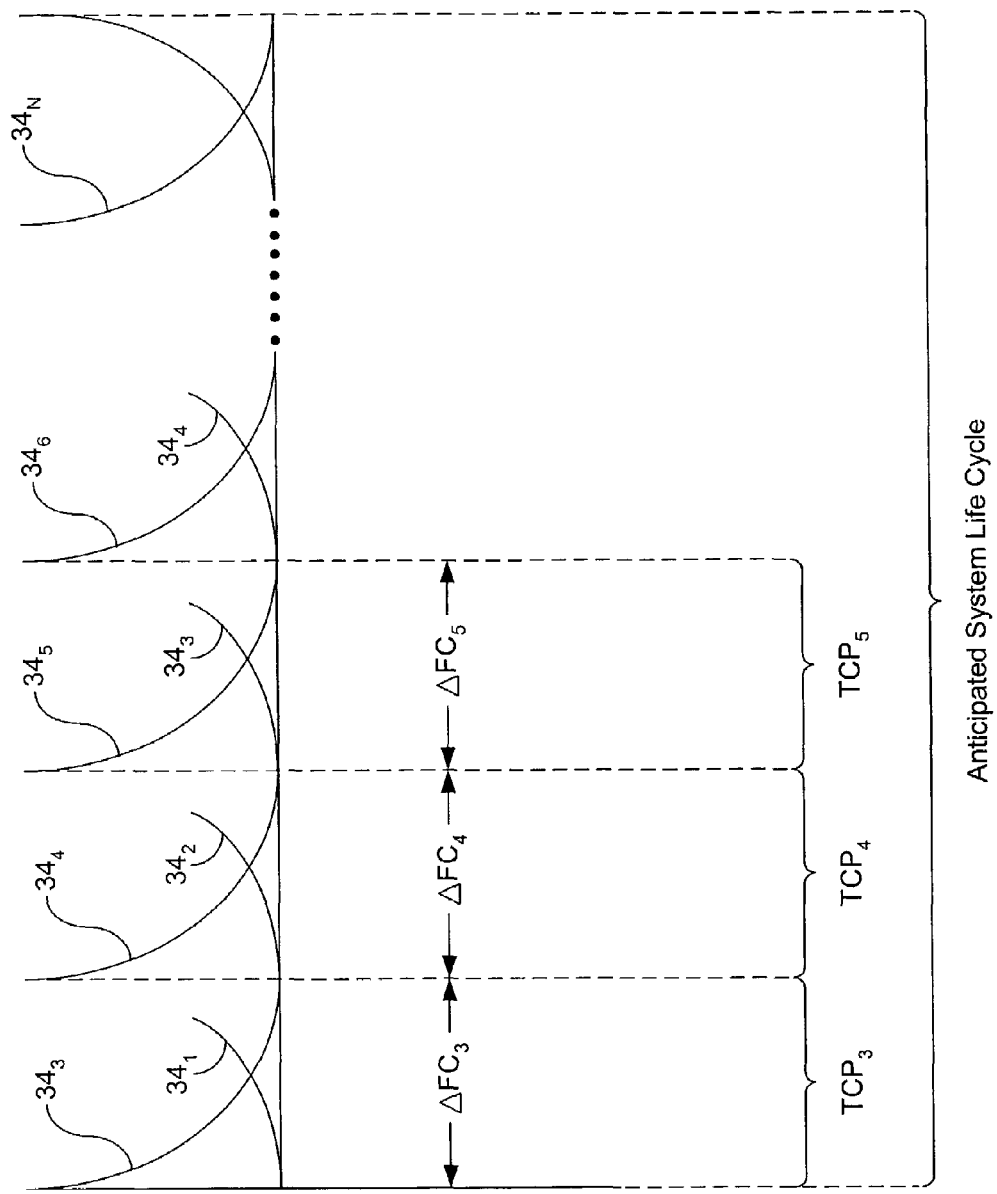
FIG. 5 is a plot of overlapping price curves that are respectively predicted by the method of FIGS. 4A-4C for the currently available and subsequent generations of a part according to an embodiment of the invention.

Referring to FIG. 1, step 32 of FIG. 4A, and FIG. 5, using the historical and other data entered in step 30, the tool predicts current and future price curves 34 and the corresponding capacity increases for each part 16 of the system 10 according to an embodiment of the invention.

For each part 16, the tool generates a respective price curve $34_1$-$34_n$ for each generation n that the tool predicts will be available during the anticipated life cycle of the system 10. For part generations that are introduced before or are predicted to become unavailable after the system's life cycle, FIG. 5 shows only the portion of the price curve that exists during the system's life cycle. For example, FIG. 5 shows only the end portions of the curves $34_1$ and $34_2$, and only the front portion of the curve $34_n$. In one embodiment, the tool generates the price curves $34_1$, $34_2$, and $34_n$ in their entirety (i.e., the tool generates the portions of curves that are outside of the system's life cycle), although in other embodiments it may calculate only the portions of these curves that exist during the system's life cycle.

The price curves 34 are each calculated in a manner similar to that used to calculate the price curve 20 (FIG. 2), and are spaced by the technology-change periodicity (TCP), which is the time between the introduction of one generation of a part 16 and the introduction of the immediately subsequent generation. The TCP is often constant over the life cycle of the system 10. That is, the $TCP_3$ between the curves $34_3$ and $34_4$ equals the $TCP_4$ between the curves $34_4$ and $34_5$. But the TCP may vary from curve 34 to curve 34. For example, if analysis of the TCPs between prior and currently available generations of a part 16 reveal a trend that the TCP is gradually decreasing over time, then the tool may determine the rate of decrease and assume this trend will continue by calculating that the TCPs between the curves 34 decrease at the same rate over time.

For each part 16, the tool also predicts the change (which is typically an increase) in functional capacity $\Delta FC$ between each generation n of the part in the manner discussed above. Although $\Delta FC$ is not a parameter of the price curves 34, it is shown in FIG. 5 for clarity of explanation. Furthermore, like the TCP, $\Delta FC$ is often constant over the life cycle of the system 10. That is, the $\Delta FC_3$ between the curves $34_3$ and $34_4$ equals the $\Delta FC_2$ between the curves $34_4$ and $34_5$. But also like the TCP, the $\Delta FC$ may vary from curve 34 to curve 34. For example, if analysis of the $\Delta FC$ for prior and currently available generations of a part 16 reveal a trend that the $\Delta FC$ is gradually increasing over time, then the tool may determine the rate of increase and assume that this trend will continue by calculating that the $\Delta FCs$ between the curves 34 increase at the same rate over time.

Still referring to step 32 of FIG. 4A, for some or all of the parts 16, the tool may use price curves 34, TCPs, and $\Delta FCs$ that it has previously calculated, or that are down loaded from an external source. In one embodiment, the tool provides a menu that lists the previously calculated curves 34 and corresponding TCPs and $\Delta FCs$, and that allows one to select between using these previously calculated parameters or having the tool generate these parameters in the manner discussed above.

Figure 6:
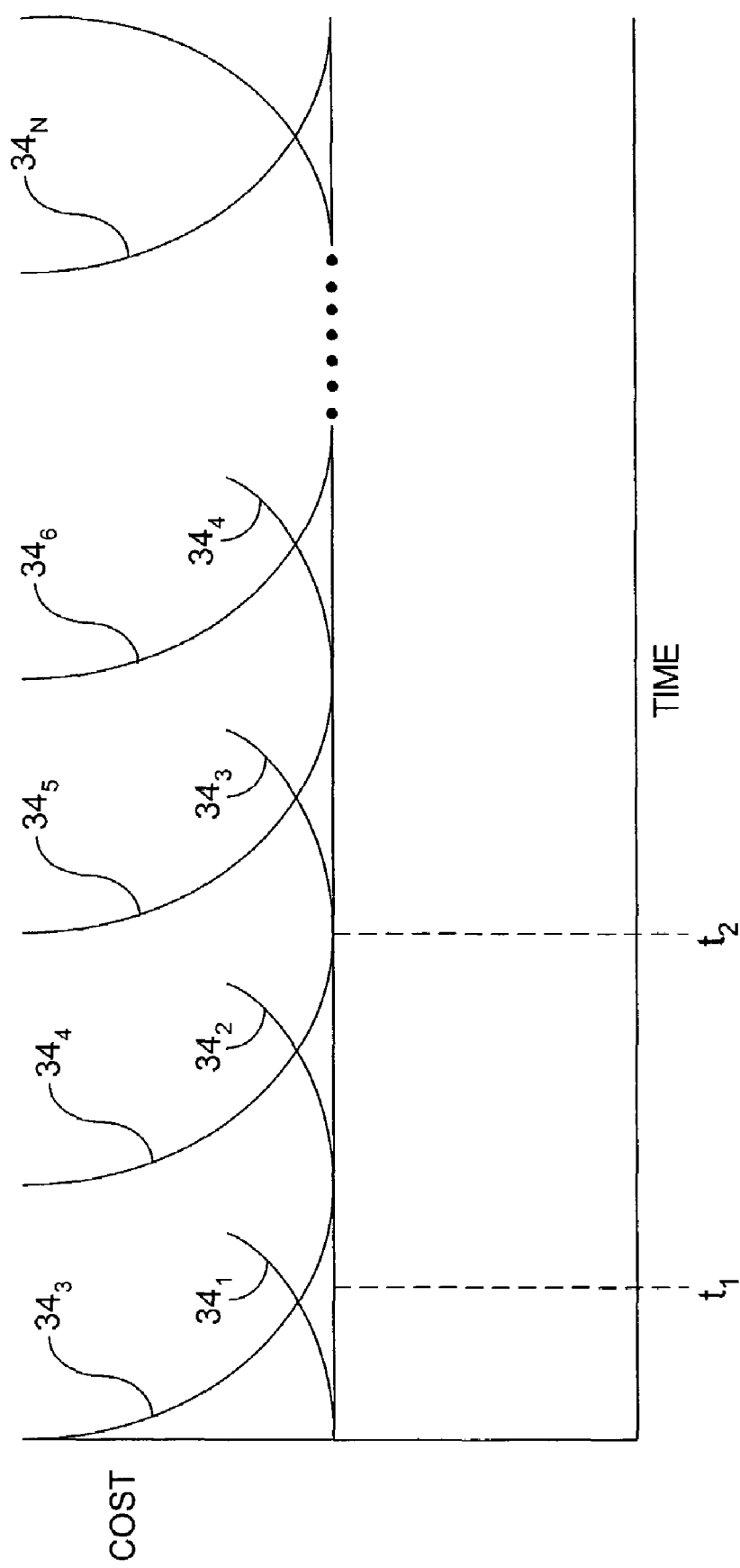
FIG. 6 is the plot of overlapping cost curves of FIG. 5 and illustrates how the method of FIGS. 4A-4C selects an available generation of a part with which to refresh the system of FIG. 1 according to an embodiment of the invention.

Referring to FIG. 1, step 36 of FIG. 4A, and FIG. 6, using the price curves 34, the tool estimates the initial acquisition cost of a system 10 as a function of the total price of the parts 16 at the time one wishes to acquire the system.

Figure 2:
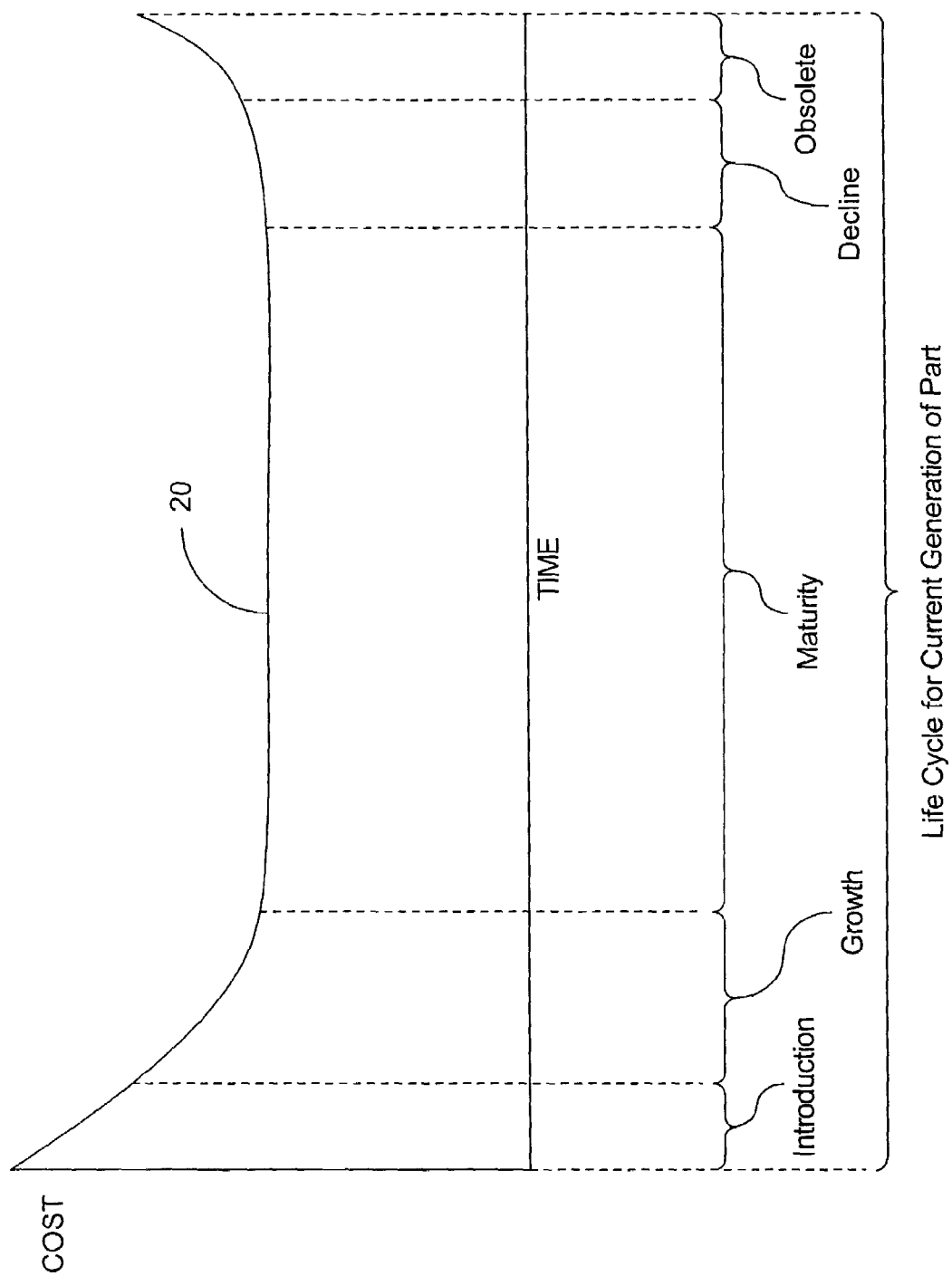
FIG. 2 is a plot of a conventional price curve for a part of the system of FIG. 1.

Referring to FIG. 6, using the price curves 34, the tool determines which generation of each part 16 to initially include in the system 10. Where there is more than one generation of a part 16 available—this is evidenced by the overlapping price curves 34—the tool selects the most recent generation that is within its maturity period (FIG. 2). In one embodiment, the tool determines that a generation of a part 16 is within its maturity period if the generation is not within the first 10% or the last 15% of its corresponding life cycle, although other percentages may be used. For example, referring to FIG. 6, assume that one wants to acquire the system 10 at time t1. At this time, three generations of a part 16 are available; these generations are respectively represented by the price curves $34_1$-$34_3$. But the generation represented by the price curve $34_1$ is within the last 15% of its life cycle, and the generation represented by the price curve $34_3$ is within the first 10% of its life cycle. Therefore, because the only generation within its maturity period is the generation represented by the price curve $34_2$, the tool selects this generation for inclusion in the system 10.

Once the tool selects the generation of each part 16 for initial inclusion in the system 10, it determines the total purchase price of all the parts. Specifically, the tool calculates the price of each selected part generation from the respective price curves 34, multiplies this price by the number of this part 16 in the system, and then sums the prices to obtain a total price for all of the parts 16 in the system 10.

The tool then determines the initial acquisition cost of the system 10 as a function of the total price of the parts 16. Specifically, the tool executes an algorithm that uses the total price of the parts 16 to estimate all of the other system-acquisition costs such as the costs for designing, assembling/installing, and testing the system 10. The algorithm then estimates the initial acquisition cost as the sum of the total price of the parts 16 and these other system-acquisition costs. Typically, such an algorithm is empirically developed based on the historical relationship between the price of parts and the initial acquisition cost for prior systems that are similar to the system 10. Because such algorithms and their development are conventional, they are not further discussed herein.

One advantage of a cost-estimation tool that implements the method of FIGS. 4A-4C is that it can estimate the initial acquisition cost of a system 10 regardless of when the system will be acquired. As discussed above in conjunction with FIGS. 1 and 2, prior cost-estimation tools calculated price curves for only the currently available generation of the parts 16. Therefore, these prior tools are unable to estimate the initial acquisition cost of a system 10 that will be acquired after the life cycle of the currently available generation of parts. But because the method of FIGS. 4A-4C generates price curves for current and future generations of the parts 16, a tool that implements this method can estimate the initial acquisition cost of a system to be acquired in the future.

Next, referring to step 38 of FIG. 4A, the tool estimates the O/S cost for the system 10 during the initial cost period and all the subsequent cost periods of the system life cycle prior the first refresh period. For example, referring to FIG. 3, the tool estimates the O/S cost for periods 1 and 2. As discussed above, the O/S cost includes all costs required to maintain the system 10 in operating condition. For example, these costs include the costs for, e.g., repair and maintenance, non-recurring engineering (NRE), periodic testing, and software upgrades.

Still referring to step 38, the tool estimates the O/S cost for each of the pre-first-refresh periods as a function of the total price for the parts 16 and the MTBF of each part 16. Specifically, the tool executes an algorithm that uses the total price of the parts 16 and the MTBF for each part—the MTBF allows the tool to anticipate when a part 16 will need replacement—to estimate the O/S cost for each of the periods before the first refresh period. Typically, such an algorithm is empirically developed based on the historical relationship between the price of parts, the MTBF of each part, and the O/S cost for prior systems that are similar to the system 10. Because such algorithms and their development are conventional, they are not further discussed herein.

Then, referring to step 40 of FIG. 4B, the tool determines the refresh strategy for each refresh period of the system's life cycle. For example, referring to FIG. 3, the tool determines the refresh strategy for every third period (e.g., third, sixth, n−2) of the system 10.

To determine the refresh strategy, the tool first identifies the refresh periods based on the refresh rate that one provides to the tool in step 30 (FIG. 4A). For example, if the refresh rate equals three throughout the life cycle of the system 10, then the tool identifies every third period as a refresh period per FIG. 3.

Next, for each identified refresh period, the tool identifies the parts 16 to be refreshed and selects the part generations with which to refresh the identified parts. In one embodiment, the tool determines that a part 16 is to be refreshed if at least one subsequent generation (relative to the generation currently installed in the system 10) of the part is available and is within its maturity period. As discussed above in conjunction with step 36 (FIG. 4A), in one embodiment the tool determines that a generation of a part 16 is within its maturity period if the generation is not within the first 10% or the last 15% of its life cycle, although other percentages may be used. Next, if there is more than one subsequent generation of the part 16 within its respective maturity period, then the tool selects the most recent generation. For example, referring to FIG. 6, assume that a refresh period for the system 10 coincides with time t2, and that the currently installed generation of a part 16 (the generation of the part in the system 10 prior to refresh) corresponds to the price curve $34_1$. The tool first determines that two subsequent generations of the part 16—the generations respectively corresponding to the curves $34_3$, and $34_4$—are available at time t2 and are within their respective maturity periods. The tool then selects the most recent one of these generations—the generation corresponding to the curve $34_4$—for refreshing the part 16.

Then, for each part 16 to be refreshed, the tool determines the complexity level of performing the refresh. As discussed above, the complexity level is the level of difficulty of the refresh, and is determined as part of the price-curve generation procedure, or may be provided to the tool by the system administrator. In one embodiment, the tool assigns to each identified refresh a level of difficulty from one to four, with four being the most difficult and one being the least difficult, and may alter the refresh strategy if the complexity is too high. For example, referring to the above example where the refresh period coincides with time t2 (FIG. 6), if refreshing the part 16 with the generation corresponding to the curve $34_4$ has a higher complexity level than refreshing the part with the generation corresponding to the curve $34_3$, then the tool may elect to use the latter generation for refresh to save costs.

Next, referring to step 42 of FIG. 4B, after the tool determines the refresh strategy, it estimates the cost of refresh for each refresh period. To estimate the refresh cost, the tool first determines the relative importance to the system 10 of each part 16 to be refreshed. Next, the tool adjusts the change in functional capacity between the initially installed and subsequent generations of a part 16 based on factors such as "critical mass." Then, the tool determines the potential functional capacity of the system 10 as a result of the refresh. Finally, the tool determines the refresh cost as a function of the potential post-refresh functional capacity of the system 10 and the portion of the initial acquisition cost attributable to the refreshed parts 16.

Figure 7:
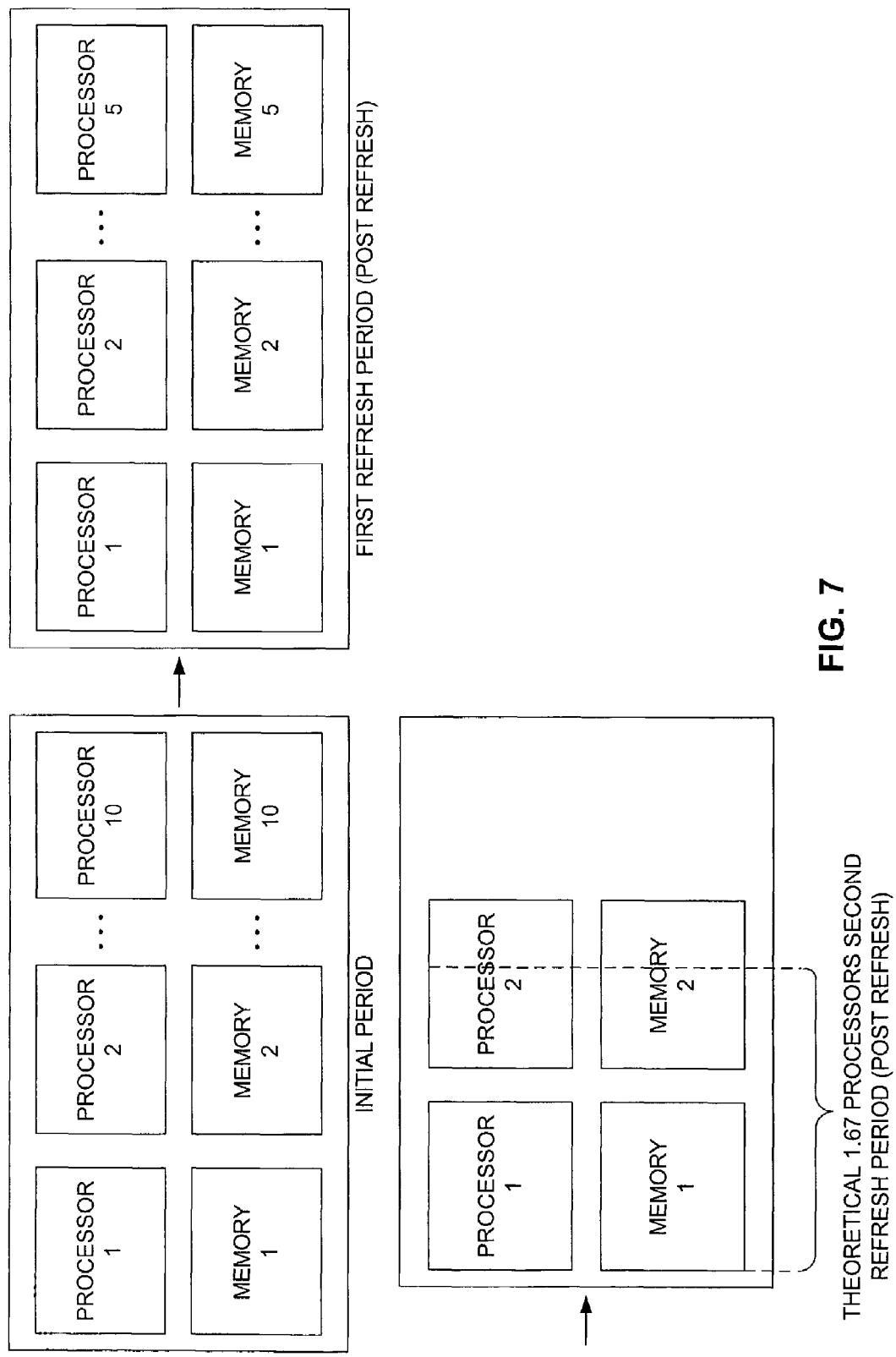
FIG. 7 is a block diagram that illustrates an example progression of the system of FIG. 1 from an initial period through the first two refresh periods according to an embodiment of the invention.

Referring to FIG. 7, the following example illustrates the tool's determination of the refresh costs for the first and second consecutive refresh periods of a system's life cycle according to an embodiment of the invention. For example, the first and second refresh periods correspond to the third and sixth period of the life cycle for a system 10 that follows the refresh strategy illustrated in FIG. 3. In addition, all amounts below are rounded to the nearest whole number or dollar amount.

FIG. 7 shows the progression of an example system 10 from the initial period of its life cycle through the second refresh period. In this example, assume that the price of all the parts 16 that initially compose the system 10 equals $10,000, and that the initial acquisition cost (step 36 of FIG. 4A) of the system equals $100,000. Further assume that only two parts of the system 10 are refreshed, the processors and memories, and that the system 10 initially includes ten processors each having a price of $300, and initially includes ten memories each having a price of $100. Moreover, assume that the first subsequent generation of processor installed during the first refresh period has a price of $250 and has twice the functional capacity ($\Delta FC=2$) of the initial generation of processor, and that the first subsequent generation of memory has a price of $75 and has twice the functional capacity of the initial generation of memory. Also, assume that the second subsequent generation of processor installed during the second refresh period has three times the functional capacity ($\Delta FC=3$) of the first subsequent generation of processor installed during the first refresh period, and that the second subsequent generation of memory has three times the functional capacity of the first subsequent generation of memory.

The tool first determines the importance to the system 10 of the processors and memories in the following manner. The total price of the initial ten processors equals 10×$300=$3000, so the importance of the processors to the system 10 equals (total price of processors/total price of all parts 16)=$3000/$10,000=0.3. Likewise, the total price of all ten memories equals 10×$100=$1000, so the importance of the memories to the system 10 equals $1000/$10,000=0.1. In other embodiments, however, the tool may determine the importance in a different manner. For example, one may provide to the tool an importance value for each part 16.

Next, the tool determines whether the $\Delta FC$ for the processors and memories needs a "critical mass" adjustment for the first refresh period. As discussed above, instead of maximizing the system capacity, the tool assumes that increases in functional capacity due to refresh will be used to minimize refresh costs. Therefore, the tool assumes that during a refresh, only the minimum number of parts needed to maintain the system capacity at 100% of its initial capacity will be refreshed. Here, because for a $\Delta FC=2=200\%$, the initial ten processors can be replaced with five next-generation processors, and the initial ten memories can be replaced with five next-generation memories such that after refresh, the system 10 will include five processors and five memories instead of the initial ten processors and ten memories. Because ten is evenly divisible by two, no critical-mass adjustment is needed. But as discussed below, a critical mass adjustment is needed for the second refresh.

Then, the tool determines the potential functional capacity of the refreshed system 10. In one embodiment, the tool determines this potential capacity as 100% (the initial functional capacity of the system 10) plus the capacity contributions from each refreshed part, and determines the contribution from each refreshed part as the product of the part's importance and its $\Delta FC$. For example, the contribution from the refreshed processors equals 0.3×200%=60%, and the contribution from the refreshed memories equals 0.1×200%=20%. Therefore, the potential functional capacity of the system 10 after the first refresh event equals 100%+60%+20%=180% of its initial capacity.

Next, the tool determines the refresh cost. As discussed above, instead of maximizing the system capacity, the tool assumes that increases in functional capacity due to refresh will be used to minimize refresh costs. Therefore, the tool assumes that during the first refresh period, only five first-subsequent-generation processors and five first-subsequent-generation memories will respectively refresh the initial ten processors and ten memories.

To determine the cost of refreshing the ten initial processors and memories with five first-subsequent-generation processors and memories, the tool first determines the portion of the initial acquisition cost attributable to the initial ten processors and memories. In one embodiment, the tool determines that this portion equals the product of the initial acquisition cost and the percentage of the price of the initial processors and memories to the total price of all parts 16. In this example, this product happens to is equal the importance factor. For example, the price of the initial ten processors equals $3000 and the total price of the initial parts 16 equals $10,000, so the attribution percentage for the processors=0.3=30%. Likewise, the attribution percentage of the memories=0.1=10%. Therefore, the portion of the initial acquisition cost attributable to the processors=0.3×$100,000=$30,000, and the portion attributable to the memories=0.1×$100,000=$10,000.

The tool then determines the cost of refreshing each part 16 as being equal to the portion of the initial acquisition cost attributable to the part divided by the potential post-refresh system capacity. Therefore, in this example, the cost of refreshing the processors=$30,000/180%=$16,667, and the cost of refreshing the memories=10,000/180%=$5556. This cost analysis takes into account the price of the five first-subsequent-generation processors and memories as well as the associated costs of refresh. For example, these associated costs include the costs for, e.g., removing the old parts to be refreshed, installing the refresh parts, testing the system 10 after refresh, and upgrading software and other portions of the system to accommodate the refresh.

The tool then determines the total cost of the first refresh event equal to the sum of the refresh cost for each part 16. In this example, because the processors and memories are the only parts being refreshed, the total refresh cost=$16,667+$5556=$22,223. If refresh of the processors or memories has a complexity level greater than one, then the tool may increase the respective refresh costs accordingly. For example, for the complexity levels two through four, the tool may increase the refresh costs by a respective predetermined percentage.

Still referring to step 42 of FIG. 4B and continuing with the above example, the tool then determines the refresh cost for the second refresh period.

The tool first recalculates the importance to the system 10 of the processors and memories in the following manner. The total price of all five processors (from the first refresh period) equals 5×$250=$1275, so the importance of the processors (after the first refresh period) to the system 10 equals $1275/$10,000=0.13, where $10,000 is the total price of all the initial parts 16 per above. Likewise, the total price of all five memories (after the first refresh period) equals 5×$75=$375, so the importance of the memories to the system 10 equals $375/$10,000=0.04. Notice that the importance is the quotient of the price of the current installed processors within the system 10 after the previous refresh period to the total price of the initially installed parts 16, not to the price of the parts after the first refresh period. In other embodiments, however, the tool may determine the importance in a different manner, such as by using the price of the parts 16 after the first refresh period.

Next, the tool determines whether the ΔFC for the processors and memories needs a "critical mass" adjustment for the first refresh period. Here, because ΔFC=3 relative to the first subsequent generations of the processors and memories, the total increase in functional capacity between the initial processors and memories and the second subsequent generations of the processors and memories equals 2×3=6. 10/6=1.67, which is not an even number. Therefore, a critical mass adjustment may be needed as described below. That is, refreshing the current five processors with 1.67 second-subsequent-generation processors would theoretically maintain the system capacity at 100%. But in actuality, 0.67 of a processor does not exist, so one needs to use at least two processors. A similar analysis applies to the memories. Therefore, not all of the capacity increase can be used to minimize refresh costs.

Then, the tool determines the potential functional capacity of the system 10 after the second refresh event. Here, the contribution from the refreshed processors equals 0.13 (new importance factor)×600% (total capacity increase relative to initial processor)=78%, and the contribution from the refreshed memories equals 0.04×600%=24%. Therefore, the potential functional capacity of the system 10 after the second refresh event equals 100%+78%+24%=202% of its initial capacity.

Next, the tool determines the theoretical refresh cost—the cost before critical-mass considerations—for the second refresh period. The portion of the initial acquisition cost attributable to the processors (after the first refresh period)=0.13×$100,000=$13,000, and the portion attributable to the memories (after the first refresh period)=0.04×$100,000=$4000. Therefore, in this example, the theoretical refresh cost of refreshing the processors=$13,000/202%=$6436, and the theoretical cost of refreshing the memories=$4000/202%=$1980. This theoretical-cost analysis takes into account the prices of the 1.67 second-subsequent-generation processors and 1.67 second-subsequent-generation memories needed to maintain the post-second-refresh capacity of the system 10 at 100% of its initial capacity, as well as the associated costs of refresh as described above.

Then, the tool calculates the actual refresh costs for the second refresh period as a function of the critical mass and the theoretical refresh costs. Because two processors are needed for the second refresh instead of the theoretically calculated 1.67 processors, in one embodiment the tool calculates the actual refresh costs for the processors equal to the product of the theoretical refresh costs times the actual number of second-subsequent-generation processors divided by the theoretical number. That is, the actual refresh cost for the processors=$6436×2 (actual processors installed during the second refresh period)/1.67 (theoretical processors needed during the second refresh period)=$7708. And using the same analysis, the actual refresh cost for the memories=$1980×2/1.67=$2371. Therefore, the actual refresh costs are higher than the theoretical refresh costs. This is because not all of the capacity increase of the processors and memories can be used to minimize the refresh costs. Consequently, the actual capacity of the system 10 after the second refresh event is higher than 100% of the initial capacity at the expense of a refresh cost that is higher than the theoretical minimum.

Next, the tool determines the total cost of refresh for the second refresh period equal to the sum of the actual refresh cost for each part. In this example, because the processors and memories are the only parts being refreshed, the total refresh cost=$7708+$2371=$10079. If refresh of the processors or memories has a complexity level greater than one, then the tool may increase the respective refresh costs accordingly as discussed above.

The tool estimates the refresh costs for the remaining refresh periods of the system's life cycle in a similar manner.

Next, referring to step 44 of FIG. 4B, after the tool determines the refresh costs for each refresh period, it estimates the O/S cost for each period starting with the first refresh period. For each refresh period, the tool first separates refresh-independent O/S costs from refresh-dependent O/S costs. Next, the tool adjusts the change in functional capacity between the currently installed and subsequent generations of a part 16 based on factors such as "critical mass." Then, the tool determines the O/S cost as a function of the adjusted capacity. For non-refresh years, the tool computes the O/S cost as a function of the total system cost as of the immediately preceding refresh period.

Referring again to FIG. 7, the following example illustrates the tool's determination of the O/S cost for the periods including and between the first and second consecutive refresh periods of the system life cycle according to an embodiment of the invention. For example, the first and second refresh periods correspond to the third and sixth period of the life cycle for a system 10 that follows the refresh strategy illustrated in FIG. 3, and the periods between the first and second refresh periods correspond to the fourth and fifth periods of the life cycle per FIG. 3.

The same assumptions are made in this example as in the example discussed above in conjunction with step 42. That is, the price of all the parts 16 that compose the initial system 10 equals $10,000, the initial acquisition cost of the system equals $100,000, only two parts, the processors and memories, of the system 10 are refreshed, where the initial system includes ten processors each having a price of $300, and includes ten memories each having a price of $100. Moreover, the first subsequent generation of processor installed during the first refresh period has a price of $250 and has twice the functional capacity (ΔFC=2) of the initial generation of processor, and the first subsequent generation of memory has a price of $75 and has twice the functional capacity of the initial generation of memory. Also, the second subsequent generation of processor installed during the second refresh period has three times the functional capacity (ΔFC=3) of the first subsequent generation of processor, and the second subsequent generation of memory has three times the functional capacity of the first subsequent generation of memory.

For the first refresh period, the tool determines the refresh-independent O/S cost as a function of the total price of the parts 16 of the initial system. Specifically, the tool executes an algorithm that uses the total initial price of the parts 16 and the MTBF for each non-refreshed part to estimate the refresh-independent O/S cost. Typically, such an algorithm is empirically developed based on the historical relationship between the total price of the parts, the MTBF of each part, and O/S cost for prior systems that are similar to the desired system. Because such algorithms and their development are conventional, they are not further discussed herein. Consequently, in this example, the tool calculates the refresh-independent O/S cost as a function of $10,000. In an alternative embodiment, the tool calculates the refresh-independent O/S costs as a function of $6,000, which is the price of all initial parts 16 minus the price of the initial processors and the initial memories ($3000+$1000=$4000). In either embodiment, the result may be scaled by a fraction less than one to account for the separate calculation of the refresh-dependent O/S cost, or this the algorithm itself may be altered in a conventional manner to account for this separate calculation.

Next, the tool determines the refresh-dependent O/S cost for the first refresh period. Specifically, for each part 16 to be refreshed, the tool divides the initial price of the part by the ΔFC for that part. So in this example, for the processors the tool generates this value=$3000/200%=$1500, and for the memories generates this value=$1000/200%=$500. Next, the tool calculates the price of all initial parts 16 other than the parts to be refreshed. So for this example, this price=$10,000−$3000−$1000=$6000. Then, the tool uses a conventional algorithm, such as one discussed in the preceding paragraph, to determine the refresh-dependent O/S cost based on the sum of these values ($6000+$1500+$500=$8000) and on the MTBF of the first subsequent generation of the refreshed parts. The tool may scale the resulting refresh-dependent O/S cost by a fraction less than one to account for the separate calculation of this cost, or the algorithm itself may be altered in a conventional manner to account for this separate calculation. Also, since ten divided by 200% equals an integer, here five, no critical-mass adjustment is necessary.

Then the tool determines the total O/S cost for the first refresh period equal to the sum of the refresh-independent and refresh-dependent O/S costs.

Next, the tool determines the O/S cost for the non-refresh period(s) between the first and second refresh periods. Because no refresh occurs during these non-refresh periods, the tool does not separate the O/S cost into refresh-independent and refresh-dependent categories. Specifically, the tool implements an algorithm that calculates the O/S cost based on the total price of all parts 16 currently installed in the system (this includes the price of the parts refreshed during the most recent refresh period) and the MTBF of these parts. Therefore, in this example, the total part price equals $6000 (initial cost of non-refreshed parts)+1250 (cost of five processors installed to refresh the initial ten processors during the first refresh period)+$375 (cost of five memories installed to refresh the initial ten memories during the first refresh period)=$7625. Therefore, the tool calculates the O/S cost for each of the non-refresh years in between the first and second refresh periods as a function of $7625 and the MTBF of all parts 16 installed in the system after the first refresh period.

The tool calculates the O/S costs for the remaining non-refresh periods of the system life cycle in a similar manner.

Still referring to step 44 of FIG. 4B, for the second refresh period, the tool determines the refresh-independent O/S cost as a function of the total price of the parts 16 as of the immediately prior refresh period (here the first refresh period). Specifically, the tool executes the same algorithm that it executed to estimate the refresh-independent O/S cost for the first refresh period, but with a different price value. Consequently, in this example, the tool calculates the refresh-independent O/S costs as a function of $7625. In an alternative embodiment, the tool calculates the refresh-independent O/S costs as a function of $6000, which is the price ($7625) of all parts 16 installed in the system as of the first refresh period minus the price of the five processors and five memories currently in the system ($1250+$375=$1625). In either embodiment, the result yielded by this algorithm may be scaled by a fraction less than one to account for the separate calculation of the refresh-dependent O/S cost, or this the algorithm itself may be altered in a conventional manner to account for this separate calculation.

Next, the tool determines the refresh-dependent O/S costs for the second refresh period. Specifically, for each part 16 to be refreshed, the tool divides the price of the first subsequent generation of the part by the ΔFC between the first subsequent generation and the second subsequent generation of the part. So in this example, for the processors the tool generates this value=$1250/300%=$417, and for the memories generates this value=$375/300%=$125. Next, the tool calculates the price (as of the previous refresh period) of all the parts 16 other than the parts to be refreshed. So for this example, this price=$7625−$1250−$375=$6000. Then, the tool uses a conventional algorithm, such as one discussed in the preceding paragraph, to determine the theoretical refresh-dependent O/S cost based on the sum of these values ($6000+$417+$125=$6542) and on the MTBF of the second subsequent generation of the refreshed parts. The tool may scale this theoretical O/S cost by a fraction less than one to account for the separate calculation of the refresh-dependent O/S cost, or the algorithm itself may be altered in a conventional manner to account for this separate calculation. Because five (the number of previous processors and memories) divided by 300% equals a non-integer 1.67, the theoretical O/S cost may be adjusted to take into account this critical mass problem. That is, this cost may be adjusted to account for the need of two actual processors and memories to respectively refresh the current five processors and memories instead of the 1.67 theoretical processors and memories. In one embodiment, the tool multiplies the values $417 and $125 by 2/1.67 and calculates the actual refresh-dependent O/S cost as a function of $6000+$417×2/1.67+$125×2/1.67=$6000+$499.40+$149.70=$6649.

Then the tool determines the total O/S cost for the second refresh period equal to the sum of the refresh-independent and refresh-dependent O/S costs for that period.

The tool estimates the O/S costs for the remaining periods of the system's life cycle in a similar manner.

Referring to steps 42 and 44 of FIG. 4A, one can see that the tool's ability to estimate refresh costs provides a major advantage over conventional cost-estimation tools that cannot do so. Per the above examples, one notices a trend of the refresh and O/S costs declining as the capacities of the parts 16 increase. Therefore, the total costs of a system 10 implemented with a refresh strategy are often significantly different than the total costs of a system implemented with a replacement strategy. Consequently, using a prior cost-estimation tool that can only estimate system costs for a replacement strategy will often provide an inaccurate comparison of costs for different implementations of a system 10 where at least one of the implementations includes a refresh strategy.

Referring to step 46 of FIG. 4C, the tool then calculates the total cost of the system 10 for each period by summing the initial acquisition cost, O/S cost, and refresh cost for each period. Of course for some periods, the initial acquisition cost and/or the refresh cost equal zero. The tool can then calculate the total system cost by summing the total costs for each period.

Referring to step 48 of FIG. 4C, if the one wishes to estimate and compare the costs of a project that includes multiple systems, then the tool can determine the total cost of all the systems by calculating the cost for each system per above and then summing these costs.

Figure 8:
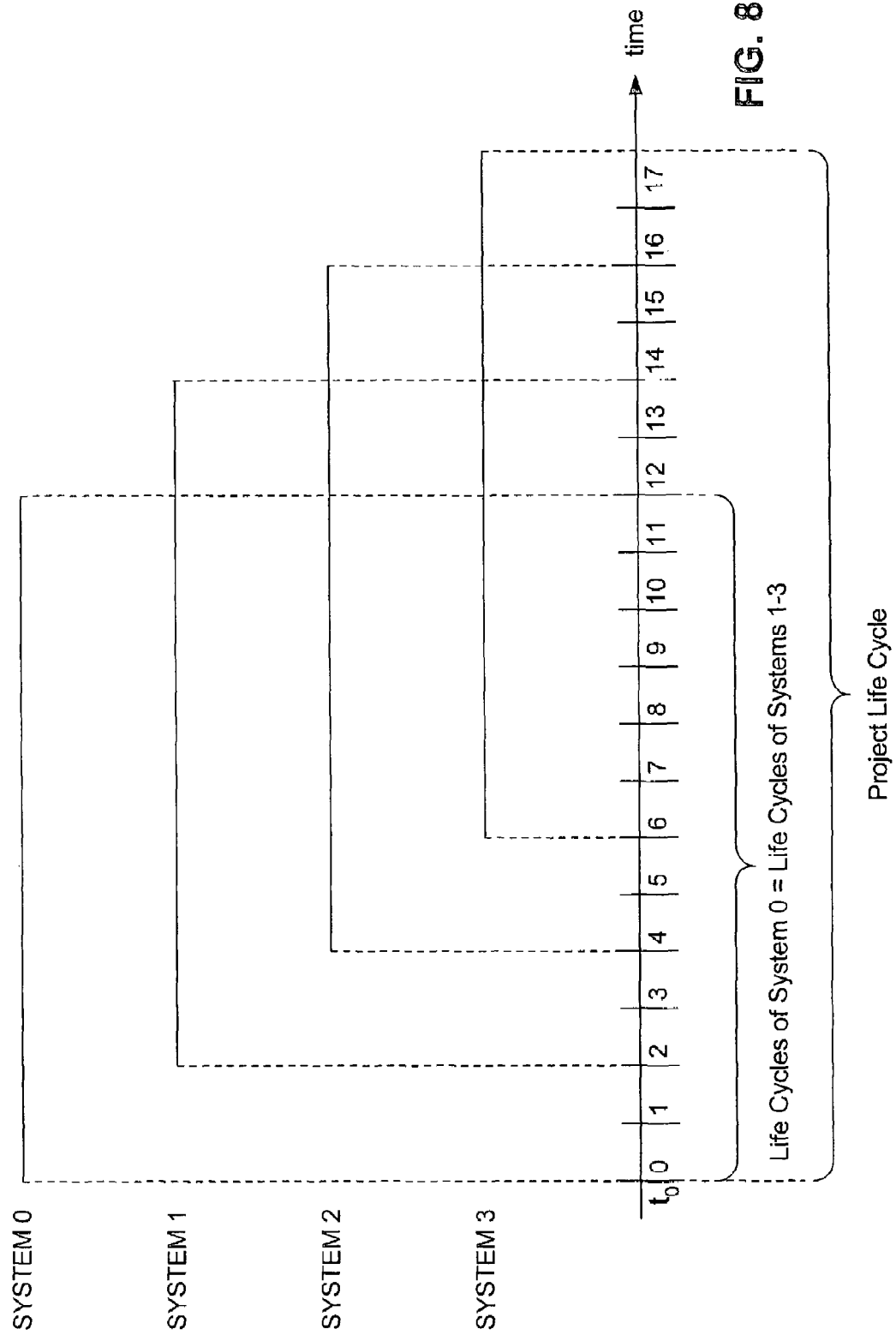
FIG. 8 is a chart that illustrates an example of the respective deployment and decommissioning of systems in a multi-system project according to an embodiment of the invention.

Still referring to step 48 and also referring to FIG. 8, in one example a project includes four systems 1-4 that each have the same life cycle of eleven periods, are respectively deployed at the beginning of periods 1, 3, 5, and 7 over the seventeen-period life cycle of the project, and are respectively decommissioned (taken out of service) at the end of periods 11, 13, 15, and 17

The total project cost per period equals the sum of the system costs per period. For example, for the periods 1-2, the project costs per period equal the costs of system 1 per period, for the periods 3-4, the project costs per period equal the sum of the costs of the systems 1 and 2, and so on.

Still referring to step 48 and FIG. 8, the tool can take into account different deployment and decommissioning strategies when estimating the total project cost. For example, one may want each initial system to include the most currently available generation of parts that are in their respective maturity periods, and then refresh these parts as discussed above. Alternatively, the designer may wish the systems 2-4 to mimic the system 1, such that the initial system 2 in the second period is the same as the initial system 1 in the first period. In this case, the tool assumes that the parts 16 are "stockpiled" for the systems 2-4. For example, the tool may assume that all of the initial parts 16 for all the systems 1-4 are purchased in period 1, all the refresh parts for the first refresh event are purchased during the first refresh period of system 1, and so on. Furthermore, one may wish that once a system is decommissioned, its parts 16 are used as spares for the systems still in service. That is, when the system 1 is decommissioned at the end of period eleven, its parts 16 are kept as spares for the systems 2-4, and so on. The tool can take this sparing strategy into account in a conventional manner when estimating the O/S costs.

Figure 9:
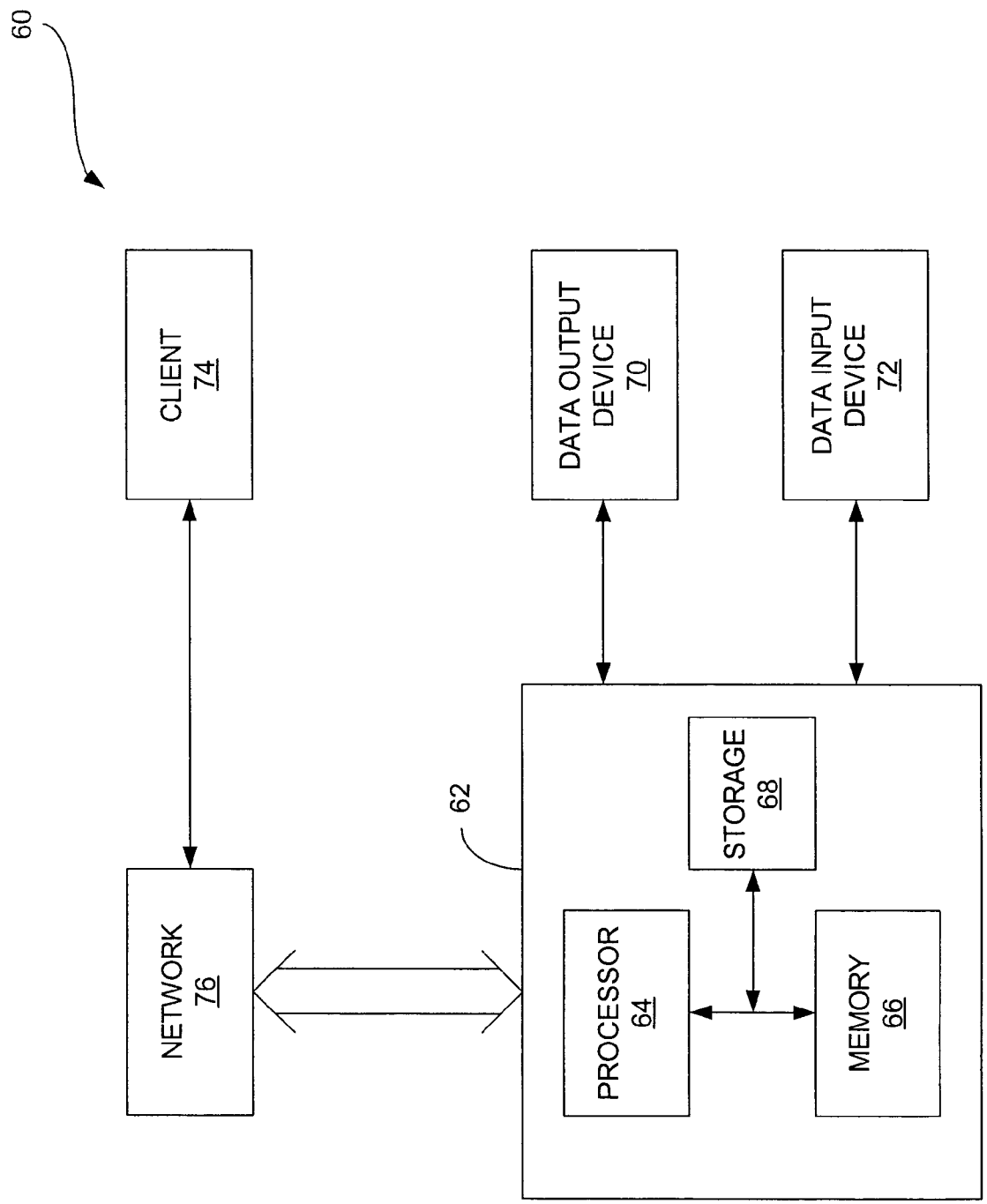
FIG. 9 is a block diagram of a computer system for running a cost-estimation software tool that executes the method of FIGS. 4A-4C according to an embodiment of the invention.

FIG. 9 is a block diagram of an electronic system 60, such as a computer system, that can execute the software tool described above in conjunction with FIGS. 3-8 according to an embodiment of the invention. The system 60 includes a computer 62, which includes a processor circuit 64, a memory circuit 66, and a storage device 68, such as a magnetic hard disk. The memory circuit 66 stores the software code that comprises the tool, and the processor circuit 64 executes this code to implement the tool. At least one data output device 70, such as a video display, and at least one data input device 72, such as a keyboard or a mouse, are coupled to the computer 62. The computer 62 is also coupled to a client 74 via a network 76, such as a local-area network (LAN), an intranet, or the internet.

In operation according to one embodiment of the invention, the system designer "runs" the tool via the output device 70 and the input device 72. Specifically, the processor circuit 64, under control of the software code, generates menus that the device 70 displays to the designer. The designer enters the data for the system 10 (step 30 of FIG. 4A) via the input device 72 as prompted by the menus, and views the results on the output device 70. The designer may print the results on a printer (not shown), or may download the results to a storage medium such as a CD-ROM (not shown) or to the client 74 or another computer (not shown) via the network 76.

In operation according to another embodiment of the invention, the system designer "runs" the tool from the client 74 via the network 76. Specifically, the computer 62 is or acts as a server. The processor circuit 64, under control of the software code, generates menus that the client 74 displays to the designer via a software application such as a web browser. The designer enters the data for the system 10 via the client 74 and web browser as prompted by the menus, and views the results via the client. The designer may print the results on a printer (not shown), or may download the results to a storage medium such as a CD-ROM (not shown) or to another computer (not shown) via the network 76.

Referring to FIGS. 1-8, other embodiments of the cost-estimation tool are contemplated. For example, instead of basing its cost estimation on a refresh strategy that attempts to minimize costs by maintaining the actual system capacity at approximately 100% of the system's initial capacity, the tool can base its cost estimation on a refresh strategy that attempts to maximize the system capacity with each refresh. In this scenario, the tool may also predict the actual system capacity after each refresh in the same way that it predicts the potential capacity as described above. Alternatively, the tool may predict the actual system capacity after each refresh without estimating the associated refresh cost. Moreover, the above-discussed algorithms may be altered according to known techniques, or the tool may use different algorithms to predict, e.g., the future price curves, refresh costs, and O/S costs. In addition, the accuracy of the tool may be increased so that it can provide an absolute estimate of the total system cost. For example, one can add to the tool a conventional algorithm that estimates the energy usage/cost of the system, and the tool can increase the accuracy of the estimated O/S cost by including this energy-usage cost. Alternatively, one can use a conventional cost-estimation tool to more accurately estimate a total cost of a system implementation based on the refresh information calculated by the inventive tool. For example, as discussed above in conjunction with FIGS. 1 and 2, some conventional cost-estimate tools can estimate a cost of a system 10 over its life cycle from the prices of the parts 16 in the BOM. Therefore, by using the refresh strategy predicted by the inventive tool to update the BOM for each refresh period, one can use such a conventional tool to estimate the total cost of the system. That is, for each refresh period, one generates an updated BOM by replacing each refreshed part 16 in the prior BOM with the subsequent-generation that the inventive tool predicts will be used to refresh the part. By running the conventional tool for each updated BOM and summing the results, one can estimate the total cost of the system 10.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method for determining a total cost of a system over a life cycle of the system, the method comprising:
calculating with a computer processor executing computer instructions a current price curve and a future price curve for a part of the system;
calculating with the computer processor executing computer instructions a total cost of the system based on the current and future price curves; and
outputting the calculated total cost of the system;
wherein calculating the current and the future price curves comprises calculating the current and future price curves from:
respective life cycles for currently available and future generations of the part;

a time between introduction of the currently available and future generations of the part;

a change in a functional capacity of the future generation of the part relative to the currently available generation of the part; and a maturity of the currently available generation of the part.

2. The method of claim 1 wherein calculating the total cost of the system comprises:

calculating a respective periodic cost of the system for each of a plurality of predetermined period of the system's life cycle; and calculating the total cost of the system as a sum of all the respective periodic costs of the system.

3. The method of claim 1 wherein calculating the total cost of the system comprises:

calculating an initial acquisition cost of the system by using the current price curve to calculate a price of a currently available generation of the part at the time the system is to be acquired;

including the initial acquisition cost in a periodic cost of the system for an initial period of the system's life cycle; and including the periodic cost in the total cost.

4. A method for determining a total cost of a system over a life cycle of the system, the method comprising:

calculating with a computer processor executing computer instructions a current price curve and a future price curve for a part of the system;

calculating with the computer processor executing computer instructions a total cost of the system based on the current and future price curves; and outputting the calculated total cost of the system;

wherein calculating the total cost of the system comprises:

selecting a refresh rate of a system life cycle for refreshing a currently installed generation of the part with a future generation;

calculating a potential post-refresh functional capacity of the system based on a functional capacity of the future generation of the part relative to a functional capacity of the currently installed generation; and calculating a refresh cost for refreshing the currently installed generation of the part with the future generation based on a price of the currently installed generation and the potential post-refresh functional capacity of the system.

5. A method for determining a total cost of a system over a life cycle of the system, the method comprising:

calculating with a computer processor executing computer instructions a current price curve and a future price curve for a part of a system;

calculating with the computer processor executing computer instructions a total cost of the system based on the current and future price curves; and outputting the calculated total cost of the system;

wherein calculating the total cost of the system comprises:

selecting a refresh rate of a system life cycle for refreshing a currently installed generation of the part with a future generation;

calculating a potential post-refresh functional capacity of the system based on a functional capacity of the future generation of the part relative to a functional capacity of an initially installed generation of the part and on an importance of the part to the system; and calculating a refresh cost for refreshing the currently installed generation of the part with the future generation based on a cost of the initially installed generation and the potential post-refresh functional capacity of the system.

6. A method for determining a total cost of a system over a life cycle of the system, the method comprising:

calculating with a computer processor executing computer instructions a current price curve and a future price curve for a part of a system;

calculating with the computer processor executing computer instructions a total cost of the system based on the current and future price curves; and outputting the calculated total cost of the system;

wherein calculating the total cost of the system comprises:

calculating a pre-refresh operation and support cost for the system as a function of a price of a currently installed generation of the part;

selecting a refresh period of a system life cycle for refreshing the currently installed generation of the part with a future generation;

calculating a potential post-refresh functional capacity of the system based on a functional capacity of the future generation of the part relative to a functional capacity of an initially installed generation of the part and on an importance of the part to the system;

calculating a refresh cost for refreshing the currently installed generation of the part with the future generation based on a cost of the initially installed generation of the part and the potential post-refresh functional capacity of the system;

calculating a capacity-independent portion of an operation and support cost for the refresh period as a function of a pre-refresh cost of all parts in the system; and calculating a capacity-dependent portion of the operation and support cost for the refresh period as a function of the cost of the currently installed generation of the part and the functional capacity of the future generation of the part.

7. A method for determining a total cost of a system over a life cycle of the system, the method comprising:

calculating with a computer processor executing computer instructions a current price curve and a future price curve for a part of a system;

calculating with the computer processor executing computer instructions the total cost of the system based on the current and future price curves; and outputting the calculated total cost of the system;

wherein calculating the total cost of the system comprises:

selecting a refresh period of a system life cycle for refreshing a currently installed generation of the part with a future generation;

calculating a potential post-refresh functional capacity of the system based on a functional capacity of the future generation of the part relative to a functional capacity of an initially installed generation of the part; and calculating a refresh cost for refreshing the currently installed generation of the part with the future generation based on a price of the initially installed generation, the potential post-refresh functional capacity of the system, and a level of difficulty for refreshing the currently installed generation with the future generation.

* * * * *

UNITED STATES PATENT AND TRADEMARK OFFICE
CERTIFICATE OF CORRECTION

| | |
|---|---|
| PATENT NO. | : 7,584,156 B2 |
| APPLICATION NO. | : 10/440032 |
| DATED | : September 1, 2009 |
| INVENTOR(S) | : Hertz et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1220 days.

Signed and Sealed this

Fourteenth Day of September, 2010

David J. Kappos
*Director of the United States Patent and Trademark Office*